United States Patent
Blackwell

[15] 3,673,586
[45] June 27, 1972

[54] RESISTANCE CONTROLLED TIMED PULSE GENERATOR

[72] Inventor: Lyman L. Blackwell, Denver County, Colo.

[73] Assignee: Statitrol Corporation, Lakewood, Colo.

[22] Filed: Feb. 19, 1970

[21] Appl. No.: 12,720

[52] U.S. Cl. ................................. 340/237 S, 250/83.6 FT
[51] Int. Cl. ............................................. G08b 17/10
[58] Field of Search ............... 340/237 S; 250/44, 43.5 D, 250/83.6 FT

[56] References Cited

UNITED STATES PATENTS 3,470,551  9/1969  Jaffe et al. ........................ 340/237 S Primary Examiner—John W. Caldwell
Assistant Examiner—Daniel Myer
Attorney—Anderson, Spangler & Wymore

[57] ABSTRACT

An electronic switching circuit responsive to a change of resistance in a sensing element, which circuit includes an insulated gate field effect transistor, a source of power, switching means interconnecting the source of power and the said transistor and a resistive sensing element interconnecting the gate of the said transistor and the power source, whereby the resistance of the sensing element controls the time required to charge the gate capacitance of the transistor and whereby the switching means opens the circuit delivering power to the transistor at such time as the gate capacitance is substantially charged.

10 Claims, 4 Drawing Figures

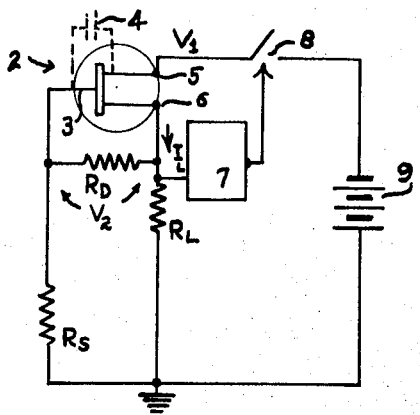
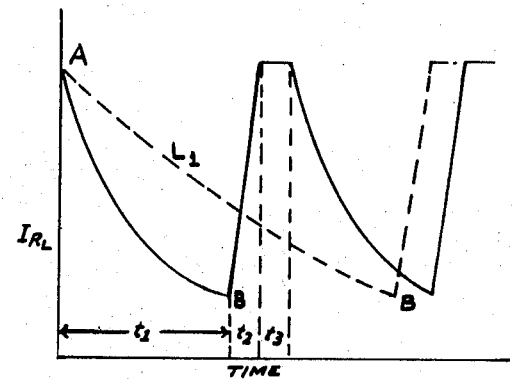
*Fig. 1*  *Fig. 2*
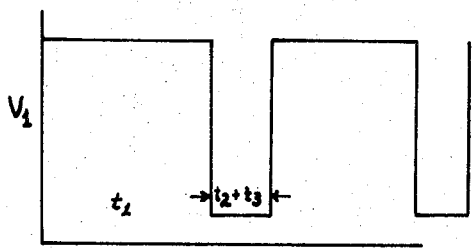
*Fig. 3*
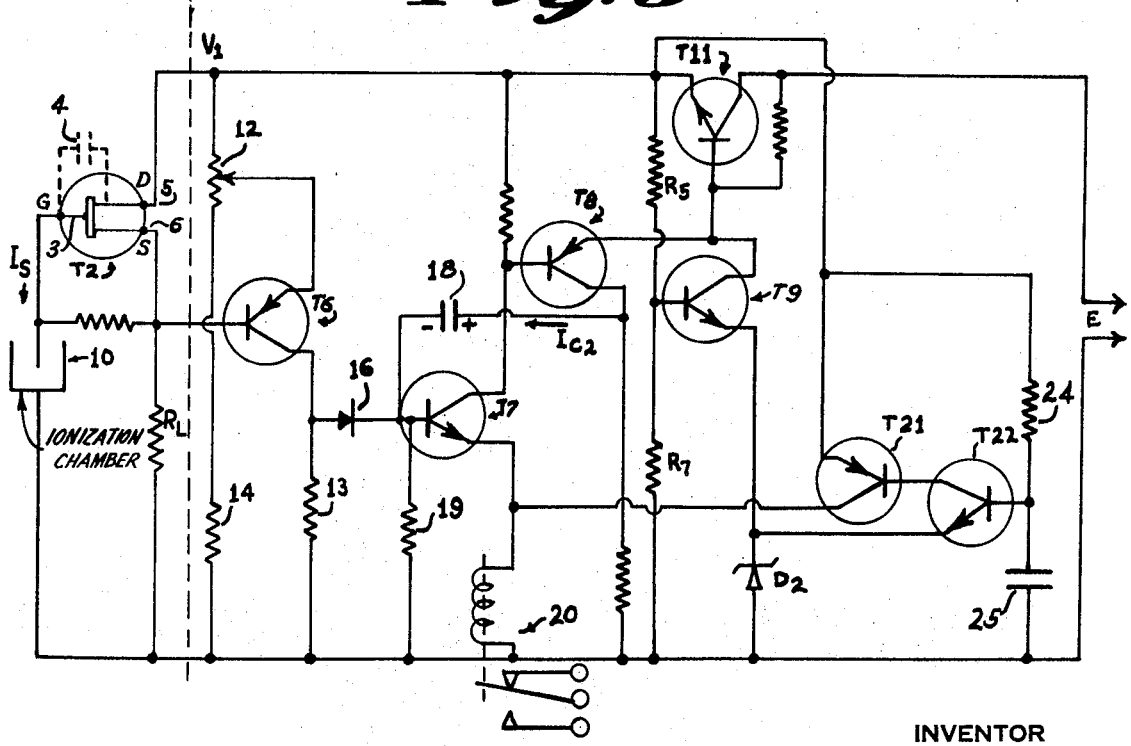
*Fig. 4*
INVENTOR
LYMAN L. BLACKWELL
BY
Anderson Spangler & Wymore
ATTORNEY form of the invention will focus on such devices.

RESISTANCE CONTROLLED TIMED PULSE GENERATOR

The present invention relates to electronic circuitry and more specifically to a circuit and means for generating a series of voltage pulses, the time constants of which are a function of a change in resistance of a sensing element within the circuit. Although the concept of the present invention is broad, the application of the invention to products of combustion detectors has been the most rewarding use to date and hence the following description of a preferred form of the invention will focus on such devices.

Having found ion chambers to be well suited for detecting products of combustion through their changes in internal resistance due to the presence of combustion products, it becomes the paramount objective of this invention to provide a simplified and reliable circuit for recognizing a small change in a very high resistance and to act on that recognition of change in order to accuate switching means for the turning on of an alarm or operating a piece of equipment.

Secondarily, the object of the invention is to take maximum advantage of the characteristics of the insulated gate field effect transistor (MOSFET) to achieve design simplicity and greater reliability than has been provided in other types of circuits having similar purposes.

Another objective of the present invention is to provide a circuit having characteristics which are well adapted to achieve the requirements of sensitivity and reliability necessary for products of combustion detectors.

A still further objective of the invention is to provide a sensing circuit which will generate a continuous series of timed voltage pulses, the timing of which is changed upon the occurrance of an alarm condition.

Other objects, advantages and features of the invention will become apparent upon reading the following detailed description of a preferred form of the invention taken in conjunction with the accompanying drawings in which:

FIG. 1 is a diagramatic and block circuit diagram of the present invention showing the elements necessary for the basic operation of the measuring circuit.

FIG. 2 is a graphical showing of the output of the circuit of FIG. 1.

FIG. 3 is a graph of the time characteristics of voltage $V_1$ of both FIGS. 1 and 4.

FIG. 4 is a schematic diagram of a products of combustion detector, employing the basic measuring circuit of FIG. 1 and showing the necessary associated circuitry to operate an alarm and indicating device.

The invention will be described first by reference to a basic circuit and then in terms of a practical circuit for use as a particles-of-combustion detector, employing an open ionization chamber as a conductive sensing means and a relay and lamp as alarm indicators.

In its simplest form, as shown in FIG. 1, the invention can be described as an electronic circuit for detecting an electrical current and converting this current to a time controlled pulsed output. The basic circuit for achieving this end includes an insulated gate field effect transistor 2, a source of power 9 connected to the drain-source terminals 5 and 6 of the transistor, with a resistance $R_L$ connected in the source lead as a means of measuring changes in the drain to source current, and a conductive sensing means $R_S$ connected between the gate 3 of the transistor 2 and ground side of the power source 9. The source terminal 6 is connected to the gate terminal 3 through a resistance $R_D$.

To more clearly illustrate the operation of the circuit, a simple switch 8 is shown connected in series with the drain terminal 5 which switch is operated from the output of the switching amplifier 7 whose input is connected to the source terminal 6. At the instant of closure of the switch 8, a voltage $V_1$ is applied across the drain 5 and source 6 of the N channel field effect transistor 2. At this instant drain to source current is a maximum. (point A, FIG. 2) The gate-to-drain effective capacitance 4 immediately starts to charge through the resistive sensing means $R_S$ and as the voltage across the capacitance 4 increases, the current $I_L$ will decrease as an expotential function of the charge across the capacitance. The time $t_1$ (FIG. 2) for $I_L$ to drop to point B will depend upon the resistive value of $R_S$. (For value of $R_S$ in the $10^{10}$ ohm to $10^{12}$ ohm region, the order of magnitude of time will be 0.1 second to several seconds.)

When the current $I_L$ has fallen to point B, the switching amplifier 7 senses the voltage which then appears across $R_L$ and opens the switch 8, thus removing the voltage $V_1$. In the absence of voltage $V_1$, the capacitor 4 discharges through $R_D$. The switching amplifier 7 holds the switch 8 open for a pre-set time interval $t_2+t_3$ (FIG. 3), which is sufficiently long to allow substantial discharge of the capacitance 4. At the end of time $t_2+t_3$, switch 8 closes and the cycle is repeated. The dotted line $L_1$ in FIG. 2 illustrates the function of the circuit with a value of $R_S$ approximately twice as large as initially described. If $R_S$ is open, the current $I_L$ would not drop sufficiently for the switching amplifier 7 to open the switch 8 and current $I_L$ and voltage $V_1$ would remain on.

The function of voltage $V_2$ is also important to this invention. Returning to the instant of closure of switch 8, the capacitance 4 is discharged so there is very little voltage across $R_D$ and therefore practically no current flowing in $R_D$. As the capacitance 4 charges, the voltage at the source terminal 6 rises with respect to ground at a rate that approximates the rise in voltage of the gate 3 with respect to ground. Therefore, as the voltage across the resistance $R_D$ remains small, the current through that resistance will be small in comparison to the current through the sensing means $R_S$, as long as the resistor $R_D$ is of the same order of magnitude as the resistance of the sensing element $R_S$. As a result, the resistance $R_S$ has a negligible effect on the charging of the capacitance 4 and therefore, the time $t_1$ (FIG. 2) is almost completely dependent on the value of the sensing element resistance $R_S$. The function of $R_D$ is to discharge capacitance 4 when $V_1$ is removed.

In FIG. 1, the switch 8 is illustrated as a mechanical switch, however, in a practical device would most likely be a solid state device.

FIG. 4 illustrates a practical circuit for a products-of-combustion detector employing the basic invention described above.

The simulated sensing element, resistor $R_S$, of FIG. 1 has been replaced in the practical circuit of FIG. 4 by an ionization chamber 10 of the type having two spaced electrodes defining a gas containing space therebetween and also including a radioactive radiation source. The prior art has found that an ion chamber of this character is a highly sensitive detector of particles of combustion. The phenomenon of detection is well known in the prior art and may briefly be described by stating that the radiation source ionizes the gas (air) within the chamber, causing the chamber to become an electrical conductor. Particles of combustion which may freely enter the chamber reduce the conductivity of the chamber, or conversely, increase the resistivity of the chamber, thus causing electrical changes in the circuitry which may be associated therewith. The function of the circuit about to be described is to detect such changes in the resistivity of the ionization chamber and to actuate an alarm.

Referring now to FIG. 4, it is seen that the application of voltage E will turn on transistor T11 while transistors T6, T7 and T8 will be turned off and a regulated voltage $V_1$ will be supplied across the drain and source terminals 5 and 6 of the field effect transistor T2, similar to the effect produced by closing the switch 8 in the circuit of FIG. 1. It can easily be seen that the transistors T9 and T11 of FIG. 4, together with the means provided by the zener diode $D_2$ and resistors $R_7$ and $R_5$ constitute a voltage regulator.

As the ionization chamber current $I_S$ charges the gate capacitance 4 of the transistor T2, the voltage across the load resistor $R_L$ decreases according to the function shown in the graph of FIG. 2. When the voltage across $R_L$ decreases to a value which is approximately equal to the emitter voltage of the transistor T6 (determined by the setting of the variable resistor 12) then transistor T6 turns on causing the voltage across the collector circuit resistor 13 to increase. When the voltage across the resistor 13 exceeds the forward turn-on conduction voltage of the diode 16, transistors T7 and T8 turn on. As the transistor T8 turns on, the charging current through the capacitance 18 accelerates the turn-on of transistors T7 and T8, driving both fully on. The voltage developed at the emitter of transistor T8 as it turns on acts to turn the transistor T11 off, thus dropping the voltage $V_1$ to a low value (c). (See FIG. 3) As in the circuit of FIG. 1, the decrease in the voltage $V_1$ supplied to the field effect transistor T2 causes that transistor to turn off with a consequent discharge of the gate capacitance 4. The length of time which the transistor T8 remains turned on depends on the time constant of the R-L network formed by the capacitor 18 and resistor 19. When the capacitor 18 becomes substantially charged the transistor T8 turns off, allowing transistor T11 to turn on once again, thus supplying $V_1$ voltage to the field effect transistor T2.

The time period $t_1$ for which transistor T2 remains on depends upon the time required to substantially charge the gate capacitance 4, which time period is effected by the conductivity of the ion sensing chamber 10. The presence in the chamber of particles of combustion will reduce the conductivity of the chamber 10 and thereby increase the time for charging the gate capacitance 4. A typical smoke signal will double the charging time. In response to a lengthened period of time for charging the gate capacitance, alarm relay 20 will be energized by the output of an integrating amplifier formed by transistors T21 and T22 in conjunction with resistor 24 and capacitor 25. The latter resistor and capacitor form a network whose time constant will determine the length of time $V_1$ must remain on before sufficient voltage is present across the capacitor 25 to turn on the transistor T22. When T22 turns on T21 is also turned on and supplies voltage across the electromagnetic coil of alarm relay 20. The voltage present across the relay coil will also act to maintain transistors T7 and T8 turned off which maintains T11 turned on with a consequent steady supply of voltage $V_1$. The circuit may be reset by temporarily removing the voltage E from the circuit. FIG. 4 illustrates a set of typical relay contacts associated with the alarm relay, which contacts are connected, in accordance with well known principles, to the desired type of alarm means upon the closing of the relay contacts.

To indicate the functioning of the circuit, a lamp or similar indicator (not shown) can be connected from a point having voltage $V_1$ to a common point of voltage potential. Under normal circumstances the lamp will flash in accordance with the on and off condition of voltage $V_1$. In alarm condition the lamp will remain lighted.

I claim:

1. An electronic switching circuit responsive to a change of resistance in a sensing element, comprising:
    an insulated gate field effect transistor, having,
        a gate,
        a drain, and
        a source;
    a source of power having two output terminals;
    switch means interconnecting one terminal of the source of power and the said transistor drain,
    a resistive load interconnecting the said transistor source and the other terminal of the source of power;
    resistive means interconnecting the said gate and the said source; and
    resistive sensing means interconnecting the said gate and the said other terminal of the source of power.

2. The combination of claim 1, and further including an integrating amplifier having an output and an input, resistance-capacitance time constant means interconnecting said input to the transistor side of the switch means,
    alarm actuating means; and
    means interconnecting the alarm actuating means and the said output of the integrating amplifier.

3. The combination of claim 2 and further including a second time delay network;
    means operatively interconnecting the said second time delay network and the switch means whereby the switching period of the switch means is responsive to the second time delay network characteristics.

4. The combination of claim 3 wherein said switch means comprises at least one solid state transistor device and means interconnecting the emitter-collector circuit of said transistor in series between the said power source and the said field effect transistor.

5. The combination of claim 4 and further including means interconnecting the output of the integrating amplifier and the switching means whereby said switching means is disabled when an output is present from the said integrating amplifier.

6. The combination of claim 5 wherein the resistive sensing means is an open ionization chamber having
    a source of radioactive radiation,
    an anode and a cathode disposed in spaced apart relation.

7. The combination of claim 6 wherein the said alarm actuating means is an electromagnetic relay.

8. An electronic switching circuit responsive to a change of resistance in a sensing element, comprising:
    an insulated gate field effect transistor, having,
        a gate,
        a drain, and
        a source;
    a source of power having two output terminals;
    switch means interconnecting one terminal of the source of power and the said drain; a switching amplifier having an input and an output, said input connected to the source-drain circuit of said field effect transistor and said output connected to the switch means and wherein said switch means is responsive to changes in voltage applied thereto;
    a resistive load interconnecting the said source and the other terminal of the source of power;
    resistive means interconnecting the said gate and the said source; and
    resistive sensing means interconnecting the said gate and the said other terminal of the said source of power wherein the resistive sensing means is an open ionization chamber having
        a source of radioactive radiation,
        an anode and a cathode disposed in spaced apart relation.

9. The combination of claim 8, and further including an integrating amplifier having an output and an input, resistance-capacitance time constant means interconnecting said input to the transistor side of the switch means;
    alarm actuating means; and
    means interconnecting the alarm actuating means and the said output of the integrating amplifier.

10. The combination of claim 9 wherein said switch means comprises at least one solid state transistor device and means interconnecting the emitter-collector circuit of said transistor in series between the said power source and the said field effect transistor.

* * * * *